United States Patent [19]

Fity et al.

[11] Patent Number: 4,668,142

[45] Date of Patent: May 26, 1987

[54] CAR-CARRIER WITH EACH WHEEL-TRAIN EQUIPPED WITH ITS OWN CARRYING CROSS-STRUCTURES

[75] Inventors: Christian Fity, Illkirch; Jean-Luc Andre, Dangolsheim, both of France

[73] Assignee: Lohr S.A., Hangenbieten, France

[21] Appl. No.: 783,202

[22] Filed: Oct. 2, 1985

[30] Foreign Application Priority Data

Nov. 15, 1984 [FR] France ............................ 84 17574

[51] Int. Cl.⁴ .............................................. B60P 3/06
[52] U.S. Cl. .......................................... 410/26; 410/8; 410/29.1; 414/228; 296/1 A
[58] Field of Search .................... 410/4, 6, 7, 8, 13, 410/14, 15, 24, 26, 29.1, 30, 3, 9, 16, 25; 296/1 A; 414/679, 537, 229, 228

[56] References Cited

U.S. PATENT DOCUMENTS

| | | | |
|---|---|---|---|
| 2,164,662 | 7/1939 | Nampa | 410/15 |
| 2,204,034 | 6/1940 | Cooper et al. | 410/14 X |
| 2,610,891 | 9/1952 | Crockett | 410/13 |
| 4,239,275 | 12/1980 | Horneys et al. | 410/26 X |
| 4,496,271 | 1/1985 | Spinosa et al. | 410/8 X |

FOREIGN PATENT DOCUMENTS

| | | | |
|---|---|---|---|
| 883127 | 7/1949 | Fed. Rep. of Germany | 410/13 |
| 1020804 | 12/1949 | France | 410/26 |

*Primary Examiner*—David A. Scherbel
*Assistant Examiner*—Glenn B. Foster
*Attorney, Agent, or Firm*—Erwin S. Teltscher

[57] ABSTRACT

Car-carrier with each wheel-train equipped with its own carrying cross-structures.

In this car carrier, the load levels (15) and (16) are composed of two side-rails (18) and (19,) which can be moved vertically along frame posts. The said side-rails are fitted with sustaining cross-structures (24) and (25) that can be moved lengthwise and can be blocked in any given position so as to create between the position of two of them a sufficiently wide interval to receive the wheelbase of each car to be carried. The lowest level (4) is realized by vertically mobile platforms, that are hinged together.

9 Claims, 9 Drawing Figures

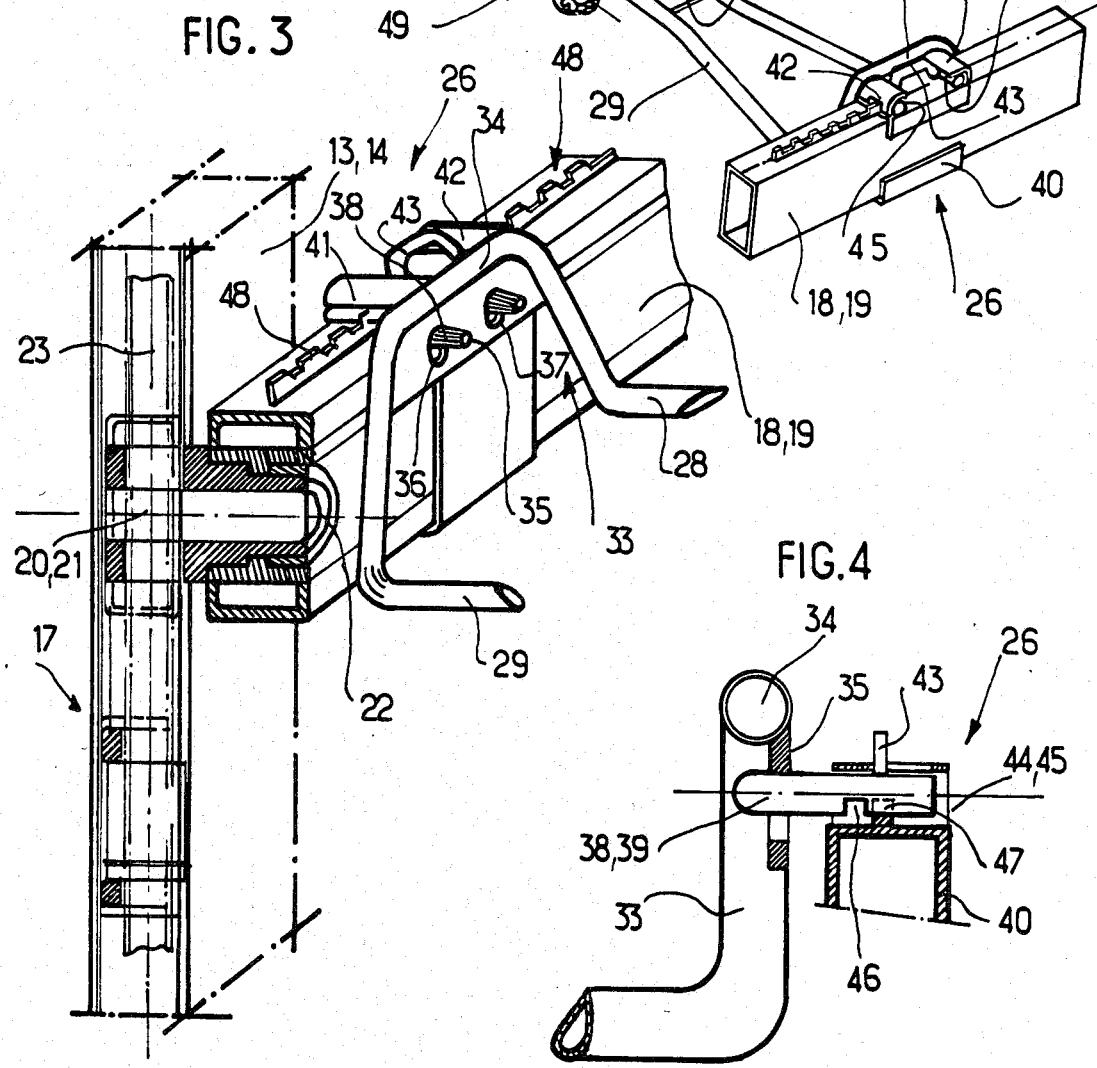

CAR-CARRIER WITH EACH WHEEL-TRAIN EQUIPPED WITH ITS OWN CARRYING CROSS-STRUCTURES

The present invention relates to a car carrier with each wheel-train equipped with its own carrying cross-structures so as to leave the underside of the carried vehicles accessible. The absence of platforms provides extra space between the axles of the upper car, whereas the lower mobile level enables the access, as well as the pre-arrangement of the cars during loading operations.

To make most of the space thus made available in height, the inventors imagined devices dispensing with the upper decks for car-carriers.

The present invention is for a car-carrier of that type, in which the upper decks have been replaced by each wheel-train being equipped with its own carrying cross-structures, thus saving the maximum of space in height by dispensing with the thickness of the carrying frame that forms the upper decks and makes free the space, corresponding to the ground clearance of the cars located at the upper levels.

The most obvious advantages of this invention are quite numerous:

Possibility of accepting to carry additional cars under good conditions on most of the existing roads.

Better adaptation of the total loading capacity to dissimilar models (improved payload).

Ease and speed of handling and dispatching the vehicles to be carried.

Improved safety for both the personnel and the vehicles: lower working level.

Loading, unloading and rolling operations are always at a low level, near the ground.

Improved access to the cars during the loading.

Some handlings can be carried out by standing on the ground

Increased rentability of the runs.

The present invention is therefore directed at a car carrier equipped with individual sustaining cross-structures fitted, so as to be mobile, onto outer side-rails that are vertically mobile along the posts; the said structures can be locked in any position of the rails, two of which permit to form an empty space that corresponds to the wheelbase of the car to be carried.

In addition to the above-mentioned advantages, the following ones have be to noted:

Universal unit adapted to any vehicle tread.

Good stability of the cars without additional constraint through partially imbedding the wheels, thus avoiding the usual wedging Possibility of easily adapting means of fastening, such as reels for cables, holders and strap catches.

The technical data and other advantages are given in the following description of one possibility, executed in the way shown on the included drawings.

FIG. 2 is a projection view of a sustaining cross-structure which can be moved all of one piece and of its tie-down device.

FIG. 3 is a mixed view, both sectional and projective, of the connection between one post, the adjacent side rail and the end of a sustaining cross-structure.

FIG. 4 is a sectional outline view of the locking mechanism.

Figure 1:
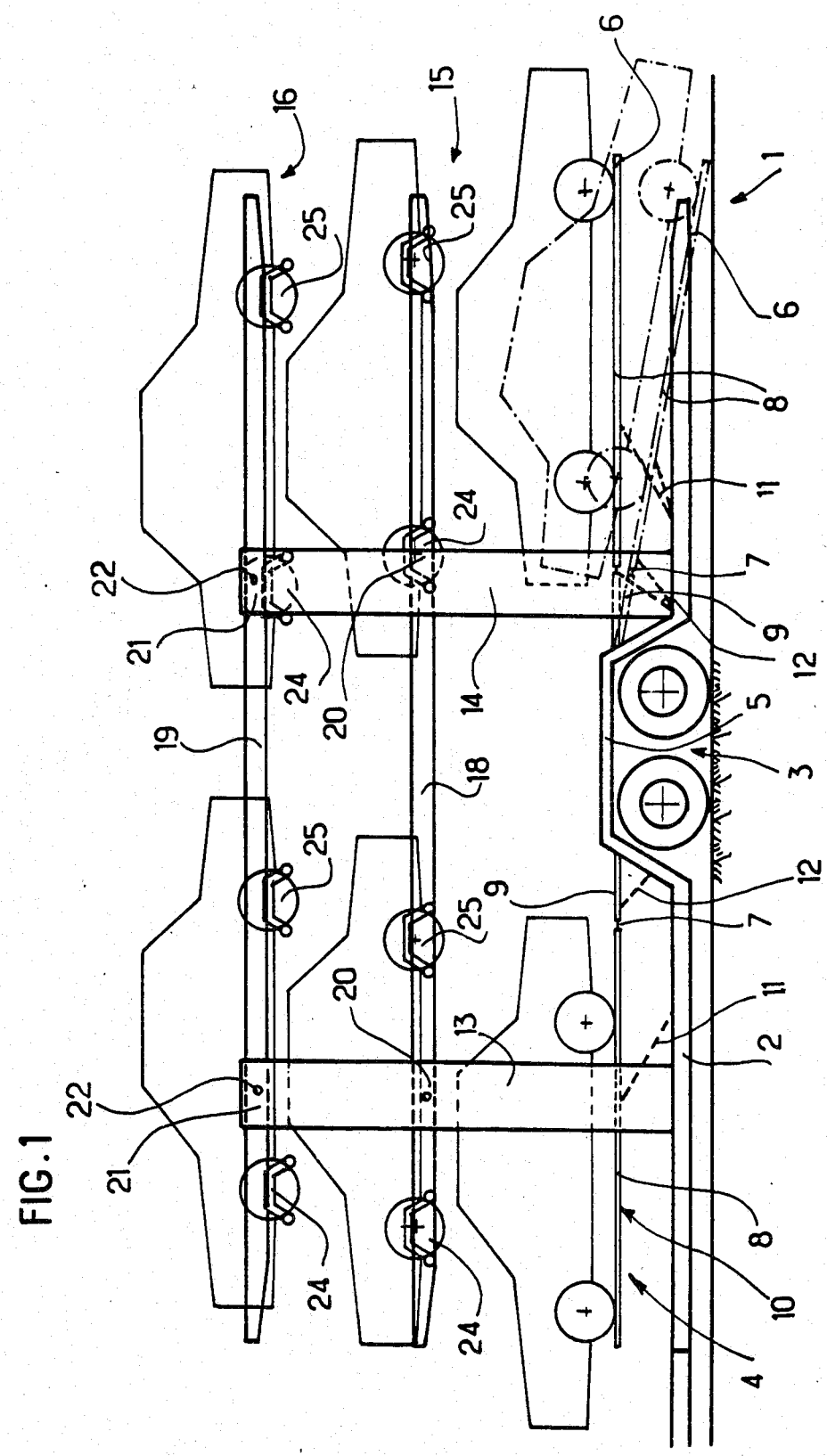
FIG. 1 is a general side view of one application of such a car carrier equipped with 3 carrying levels.
Figure 5:
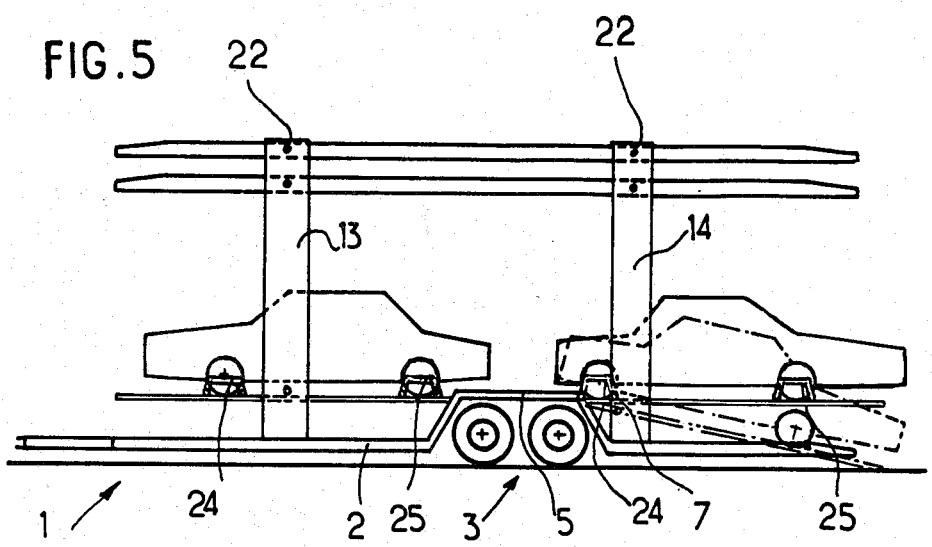
FIGS. 5 to 9 are simplified diagrams illustrating the main working stages of the car carrier according to the invention.

FIG. 5: access to the loading level—Loading with raised side-rails.

Figure 6:
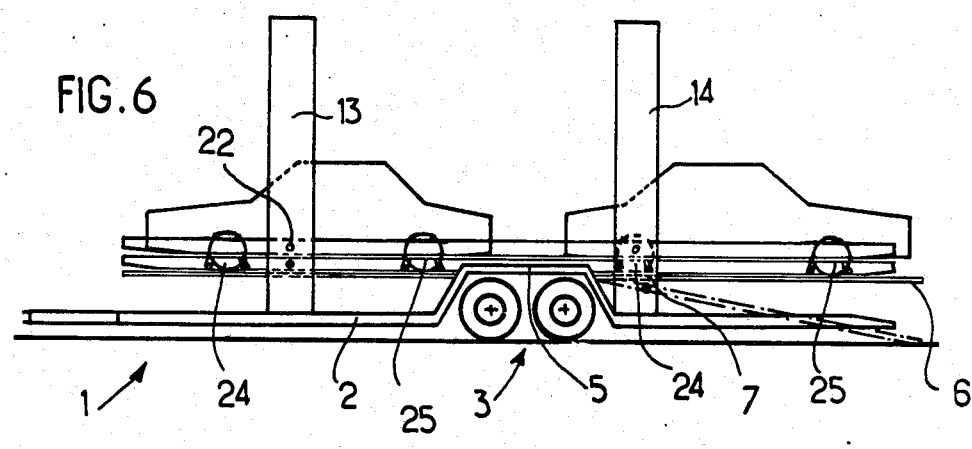

FIG. 6: loading level in loaded bottom position. The carrying side-rails are on the loading level.

Figure 7:
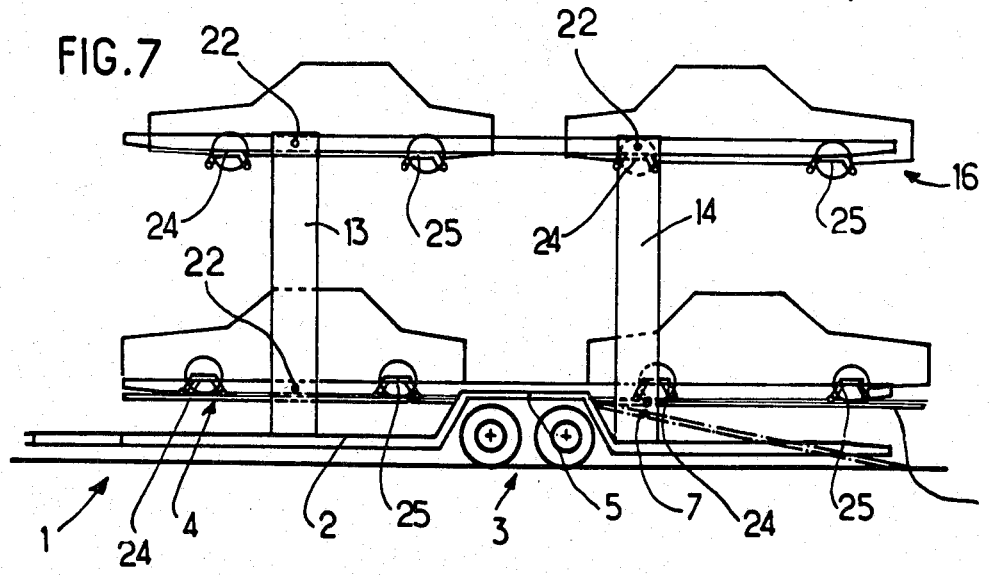

FIG. 7: the upper level in raised position—the upper level is fully loaded.

Figure 8:
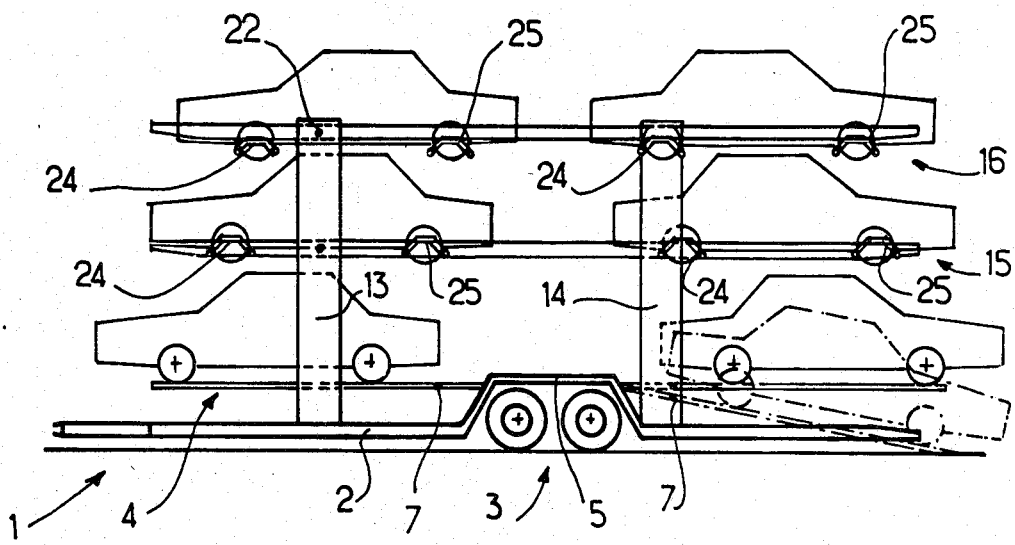

FIG. 8: the upper level in raised position—the intermediate level in raised position. Ultimate loading of the loading level.

Figure 9:
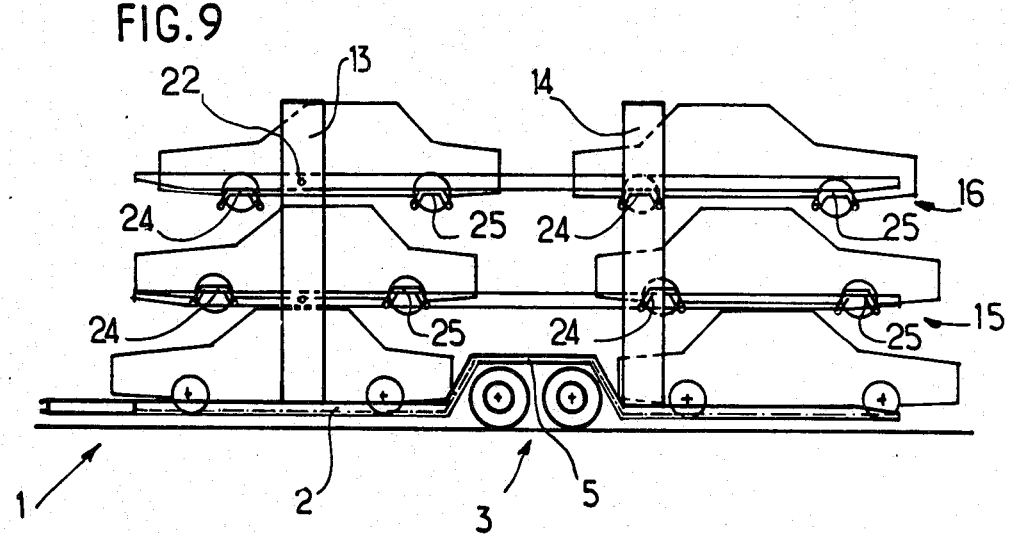

FIG. 9: The loading is completed; both the upper level and the intermediate level are in their normal positions. The loading level has merged with the trailer frame.

The drawing shows a car carrier trailer. Obviously, the invention applies to various designs of car carrying vehicles, such as trucks, semi-trailers, garages, storage etc.

The trailer (1) comprises a frame (2) mounted on a wheel train (3).

The lowest level of the trailer forms the loading level (4). It consists of a combination of platforms which provide direct access from the ground-level of a loading-platform onto the truck or the trailer and also for pre-arrangement for their loading onto the upper levels.

The said lower level is composed of three pivoting articulated parts (for instance hinge-pivot):

one fixed central piece or central platform (5) situated right on top of the wheel-train (3), a tail piece forming the lower rear level (6) articulated in point (7) at the rear end of the central platform (5) composed of two platforms (8) and (9) hinged together by means of the same connection joint (7), a front piece forming the lower front level (10) articulated at the front of the central platform (5) composed of two identical platforms (8) and (9) hinged together by means of the same connection joint (7).

In transport position, the lowest level at the tail end (6) maintains the cars in a low position, platform (8) being in a horizontal position above the ground, at a lower level than the central platform (5) and platform (9) being in a tilted position behind the wheel-train (3).

Using the frame (2) as a bearing area, the lifting jacks (11) and (12) can, by bearing on the tilted platform (9) and on the platform (8), put the rear lower level (6) into a tilted position in which platforms (8) and (9) form one continuous deck whose rear end touches the ground. This configuration enables the vehicle to run directly from the soil onto the loading area.

By means of the same lifting jacks (11) and (12), the last car put on to the loading area can be raised from the tilted position to the extended position of the lower central platform (5) to pre-arrange the vehicles for the loading on the upper levels, as well as of lowering it to get it into transport position.

The lower front level (10) maintains the vehicles in the low transport position, platform (8) being horizontally above the soil in a position that is below that of the lower central platform (5) with platform (9) being in a tilted position at the front of the wheel-train (3).

Using the frame (2) as a bearing area, the lifting jacks (11) and (12) can, by bearing on the tilted platform (8), put the lower front level (10) into an extended position of the central platform (5), platforms (8) and (9) forming then one level deck. Furthermore, using the same lifting jacks, the front end of platform (8) can be raised adequately to form an access ramp to the towing truck.

Using the same lifting jacks, the car on the loading area placed on the lower front level (10) can be lowered into low position corresponding to the transport position.

The trailer frame has posts on both sides of the wheels, a front one (13) and a rear one (14), which are duplicated on the opposite longitudinal side.

The said posts sustain two carrying levels, an intermediate one (15) and an upper one (16). They contain the hoisting devices such as (17) proper to each level, with screws, jacks, cables, chains and any other adequate means combined to form the hoisting device.

The carrying levels (15) and (16) are each composed of two outer side-rails (18) and (19) linked as exemplified at (20) and (21) with the adjacent posts (13) and (14) by means of a pivotal axle (22) as represented in FIG. 3 and moving vertically along represented column (23) situated inside a post through the action of a lifting jack.

On these notched or continous side-rails are fitted sliding or rolling carrying side-structures such as (24) and (25) with two for each vehicle.

The said carrying side-structures can be moved along and blocked in any given position along the side-rails (18) and (19) to realize, through the position of a sequence of two of them, an empty space corresponding to the wheelbase of each car to be carried. The basic execution of these structures is composed of the following items.

The side-rails are joined together by (27) composed of two tubular elements (28) and (29) placed parallel to one another and connected in their middle (30) by braces (31) and (32). The ends of the elements (28) and (29) curve out slightly from the middle (30) towards the side-rails to acheive a better hold on the wheels which, as a rule, are of a bigger diameter on wider vehicles, and to accomodate differently sized wheel bases, as can be clearly seen from FIG. 2.

This gradual curving out of the tubular elements (28) and (29) corresponds to the best average means of embedding considering the vast range of sizes of treads and wheel diameters of standard car-makes.

The tubular elements (28) and (29) are connected at their ends by a clasping loop which at (33) forms a right angle with the junction plane determined by the two tubular elements (28) and (29). The upper horizontal part (34) of the clasping loop and its round-offs or arcuate portions are steadied by a support plate (35) through which the ends of the carrying side-structures are connected to the locking device (26). In each support plate (35) there are slightly oblong vertical openings (36) and (37), crossed by cylindrical and retractable dogs with a slightly cone-shaped end piece.

The carrying cross-structures (24) and (25) are sufficiently high to allow the openings (36) and (37) to be level with the locking-dogs (38) and (39) when they are on the loading level, and the side-rails (18) and (19) are in low position. The said locking-dogs are part of the locking device described hereafter with reference to FIGS. 2, 3 and 4.

The locking devices (26) slide along the side-rails (18) and (19). Their shape (40) is that of a sleeve gliding or rolling along the side-rails. In its upper part it (40) has two parallel cylindrical recesses (41) and (42) in which are mounted the locking dogs (38) and (39) which are mobile and form one piece with a working handle along openings (44) and (45) made in the recesses (41) and (42).

The slightly conical and cylindrical-shaped dogs (38) and (39) have a transversal groove (46) which can slide along a toothed (47) rack (48) fitted on to the side-rails (18) and (19) to connect the carrying side-structure (24) or (25) with the locking device (26) and at the same time the longitudinal locking of the devices (26) on the outer side-rails (18) and (19), the dogs fitting into the teeth (47) of the rack (48) as shown in FIG. 4.

When the dogs (38) and (39) are retracted, the carrying cross-structures (24) or (25) become disengaged from the devices (26) because of their transversal grooves (46) the device (26) becomes free from the rack (48). The structure can then slide freely along the side-rails (18) or (19).

The carrying side structures (24) or (25) can receive in their middle fastening devices such as (49) drums, winches or others.

The carrying side structures such as (24) and (25) come to rest on the loading area (4) when the levels (15) and (16) are in low position. In that position the side-rails are superimposed above the loading level. Because of their configuration, it is necessary to put the carrying side structures (24) and (25) at different depths for levels (15) and (16). However, identical cross-structures can be used for both levels.

The locking devices (26) for the intermediate level (15) are fixed on the side-rails (18) and (19) by means of the dogs (38) and (39) arranged on the upper surface of the side-rails.

The locking devices (26) for the upper level (16) are fixed on the side-racks (18) and (19) by means of the dogs (38) and (39) on the lower surface of the side-rails. Through this arrangement, when the carrying side-rails are superimposed in low position and rest on the loading area, the dogs of both levels can be placed in an horizontal plan and parallel with the loading area; thus, the carrying side-structures (24) and (25) of both levels can be identical and rest simultaneously on the loading area (4).

Hereafter is the description of the main stages of the way, the car-carrier works according to the invention as seen through the FIGS. 5 to 9.

The loading process starts with the car-carrier being in the following situation: The loading plane (4) is either in upper position or "platform level" or in a tilted position so as to be able to load directly from ground-level. The side-rails (18) and (19) of the intermediate and upper carrying levels are in raised position. The first series of side-structures are placed in the previously determined spots corresponding exactly to the wheel-trains and wheelbases of the vehicles to be loaded, according to the loading plan. Then the first batch of vehicles is put on the loading plan (FIG. 5). The vehicles are brought along and placed exactly in the precise spots where their tyres fit into the inverval between the two tubular elements of the carrying cross-structures accurately spaced previously.

Both side-rails (18) and (19) are simultaneously lowered into a superimposed position on the loading plan (FIG. 6). Then the ends of the carrying cross-structures are locked by slipping the dogs (38) and (39) into the openings of the support plates (35).

The upper level is raised with its load of cars as high as possible limited only by the height of the posts (FIG. 7). If necessary, the cars may be fastened from beneath by observing the usual security measures.

Then comes the turn of the second load of cars which form the intermediate level by locking the carrying structures in the allotted spots determined by the loading plan.

The second load is then lifted higher than for the normal cruising speed height so that the last batch of cars can be put on the loading plan, the latter being in a raised position during all this loading process.

The loading plan (4) is then lowered and on either side of the wheel-train it separates into a ramp and a carrying-plane by means of suitable jacks.

The cars on the lowest level are placed in the lowest possible position. Then the intermediate level (15) and finally the top level (16) are lowered so that the tops of the cars on the lower level are fitted into the underside of the higher level. Obviously, care has to be taken to leave a security gap sufficiently wide to allow for the jolts caused by road bumps.

This invention gives the car-carrier the particularity of permitting three levels of cars while allowing for the minimum gaps; thus, it corresponds to the regulations of most states on most highways.

Secondary variations and substitutions by equivalent contrivances or any other changes which are not the fact of an invention are covered by this invention.

We claim:

1. A car-carrier adapted to carry cars of differently sized wheel diameters and differently sized wheel bases, comprising in combination a plurality of substantially vertical frame posts spaced from one another horizontally in a longitudinal direction, a plurality of loading levels spaced from one another in a vertical direction, and including a lower loading level, an intermediate loading level, and an upper loading level, each of said upper and intermediate loading levels including two side rails spaced from one another along said longitudinal direction, and being vertically mobile along said frame posts, a plurality of load-carrying cross-structures movable along said longitudinal direction on said side rails, and fastenable at any point along the longitudinal length of said side rails, each cross-structure having two tubular elements extending transverse to said longitudinal direction, and converging from respective ends thereof towards the middle so as to form continuously variable openings in which the car wheels are received, means to provide between a pair of said cross-structures an empty space corresponding to the wheel base of a car, sufficient to contain the wheel base placed on a corresponding one of said loading levels, whereby the car wheels of the wheel base are embedded in variable openings of said pair of said cross structures, yet are free of any additional constraint, and said lower loading level including a stationary central platform and two movable platforms, said movable platforms being hingeably connected to said central portion along respective joints extending transversely to said longitudinal direction, said side rails of said intermediate and upper loading levels being vertically movable along said frame posts so that they may be superimposed on said lower level before loading, then may be loaded by placing the cars on said cross-structures of said side rails, and then may be lifted along said frame posts.

2. A car-carrier as defined in claim 1, wherein said load-carrying cross-structures are spaced from one another along said longitudinal direction, each tubular element having a middle region and two end regions spaced from one another long said transverse direction, said tubular elements of each of said load-carrying cross-structures being connected with one another in said middle region and in said end regions, said tubular elements being adapted to hold the wheels of differently sized wheel bases.

3. A car-carrier as defined in claim 2, and further comprising first connecting means for connecting said tubular elements of each of said load-carrying cross-structures in said middle region to one another, said first connecting means including braces.

4. A car-carrier as defined in claim 2, and further comprising second connnecting means for connecting said tubular elements of each of said load-carrying cross-structures at each of said ends, and including a clasping loop extending in an upright direction.

5. A car-carrier as defined in claim 4, where each of said clasping loops includes a horizontally extending top part and two arcuate portions extending therefrom, and further comprising a support plate associated with each of said clasping loops to reinforce the latter, and a locking device movable on each of said side rails and connected with respect to a corresponding one of said support plates.

6. A car-carrier as defined in claim 5, wherein each of said support plates has oblong openings, each of said locking devices carrying dogs insertable into said oblong openings.

7. The car-carrier as defined in claim 6, where each of said locking devices is a sleeve arranged to move on a respective one of said side rails and having an upper part provided with a recess for accomodating said dogs.

8. The car-carrier in claim 7, and further comprising an operating handle connected with said dogs so as to form a one-piece member, said dogs being retractable from said openings by outward movement of said handle, whereby said cross-structures are released so as to be movable along said rails.

9. The car-carrier as defined in claim 6, and further comprising a toothed rack extending along each of said side rails and provided with a pluraity of teeth, each of said dogs having a transversely extending groove, said toothed rack being slidable in said groove so as to connect said load-carrying cross-structures with said locking devices by means of said dogs, and to simultaneously lock said locking devices onto said side rails, said dogs being formed so as to fit into said teeth of said toothed rack.

* * * * *